(12) United States Patent
Yang et al.

(10) Patent No.: US 7,352,595 B2
(45) Date of Patent: *Apr. 1, 2008

(54) PRIMARY-SIDE CONTROLLED SWITCHING REGULATOR

(75) Inventors: Ta-yung Yang, Milpitas, CA (US); Chuh-Ching Li, Jhongli (TW); Feng Cheng Tsao, Linbian Township, Pingtung County (TW)

(73) Assignee: System General Corp., Taipei Hsien (TW)

( * ) Notice: Subject to any disclaimer, the term of this patent is extended or adjusted under 35 U.S.C. 154(b) by 139 days.

This patent is subject to a terminal disclaimer.

(21) Appl. No.: 11/270,867

(22) Filed: Nov. 8, 2005

(65) Prior Publication Data
US 2007/0103134 A1    May 10, 2007

(51) Int. Cl.
*H02M 3/335* (2006.01)
(52) U.S. Cl. .................. 363/21.13; 363/21.15
(58) Field of Classification Search ........... 363/21.2, 363/21.13, 16–19, 95, 89, 97, 37; 323/222, 323/207, 288, 299, 287, 300
See application file for complete search history.

(56) References Cited

U.S. PATENT DOCUMENTS

| 6,721,192 | B1 | 4/2004 | Yang et al. ............. 363/21.18 |
| 6,836,415 | B1 | 12/2004 | Yang et al. ............. 363/21.01 |
| 6,862,194 | B2 | 3/2005 | Yang et al. ............. 363/16 |
| 7,161,816 | B2 * | 1/2007 | Shteynberg et al. ...... 363/21.13 |

* cited by examiner

*Primary Examiner*—Rajnikant B. Patel
(74) *Attorney, Agent, or Firm*—J.C. Patents

(57) ABSTRACT

A switching regulator includes a switching device to switch a transformer from a primary-side to secondary side. A control circuit generates a switching signal for regulating output of the switching regulator. The control circuit includes a first circuit to generate a first signal and a timing signal by measuring a reflected signal of the transformer. A second circuit produces a second signal by integrating a current signal with the timing signal. The current signal represents a primary-side switching current of the transformer. A first feedback circuit produces a first feedback signal in response to the first signal and the reference signal, in which the reference signal is varied in response to the change of the second signal. Furthermore, a second feedback circuit generates a second feedback signal in response to the second signal. A switching control circuit generates the switching signal in response to the feedback signals.

27 Claims, 10 Drawing Sheets

PRIMARY-SIDE CONTROLLED SWITCHING REGULATOR

BACKGROUND OF THE INVENTION

1. Field of the Invention

The present invention relates to a switching regulator, and more specifically it relates to an isolated switching regulator.

2. Description of Related Art

Various switching regulators have been widely used for providing regulated voltage and current. For safety reasons, off-line switching regulators must provide isolation between their primary side and secondary side. Therefore, a control circuit is equipped at the primary side of a switching regulator, an optical-coupler, and the secondary-side circuit are needed to regulate an output voltage and an output current of the switching regulator. To reduce the size and cost of the switching regulator, the need of optical-coupler and secondary-side circuit to be eliminated is the trend.

In recent developments, many primary side control schemes have been disclosed such as U.S. Pat. No. 6,721,192 entitled "PWM controller regulating output voltage and output current in primary side" Yang et al., U.S. Pat. No. 6,836,415 entitled "Primary-side regulated pulse width modulation controller with improved load regulation" Yang, et al; and U.S. Pat. No. 6,862,194 entitled "Flyback power converter having a constant voltage and a constant current output under primary-side PWM control" Yang, et al. However, the drawback of the aforementioned conventional primary side control schemes is the inaccurate control of the output voltage and output current.

The object of the present invention is to provide a switching regulator that is able to accurately control the output voltage and the output current at the primary side of the switching regulator. Therefore, the size and cost of the switching regulator is reduced.

SUMMARY OF THE INVENTION

A primary-side controlled switching regulator (switching regulator) includes a switching device to switch a transformer for transferring the energy from a primary-side to a secondary side of the switching regulator. A control circuit is coupled to the transformer for generating a switching signal to switch the switching device and to regulate the output of the switching regulator. A first circuit coupled to the transformer is included in the control circuit for generating a first signal and a timing signal by measuring a reflected signal of the transformer. A discharge time of the transformer is represented by the timing signal. A second signal is produced by a second circuit and a third circuit by integrating a current signal with the timing signal, in which the current signal represents a primary-side switching current of the transformer. In addition, a time constant of the third circuit is correlated with a switching period of the switching signal. A first error amplifier having a first reference signal is utilized to generate a first feedback signal in response to the first signal. To improve the load regulation, the first reference signal is increased in response to the increase of the second signal. A second feedback signal is generated by a second error amplifier having a second reference signal in response to the second signal. Accordingly, the switching signal is generated by a switching control circuit in response to the first feedback signal and the second feedback signal. The switching signal has a minimum on-time when the switching signal is enabled, which further ensures a minimum value of the discharge time for the multi-sampling of the reflected signal.

It is to be understood that both the foregoing general descriptions and the following detailed descriptions are exemplary, and are intended to provide further explanation of the invention as claimed. Still further objects and advantages will become apparent from a consideration of the ensuing description and drawings.

BRIEF DESCRIPTION OF THE DRAWINGS

The accompanying drawings are included to provide further understanding of the invention, and are incorporated into and constitute a part of this specification. The drawings illustrate embodiments of the invention and, together with the description, serve to explain the principles of the invention.

DESCRIPTION OF THE EMBODIMENTS

Figure 1:
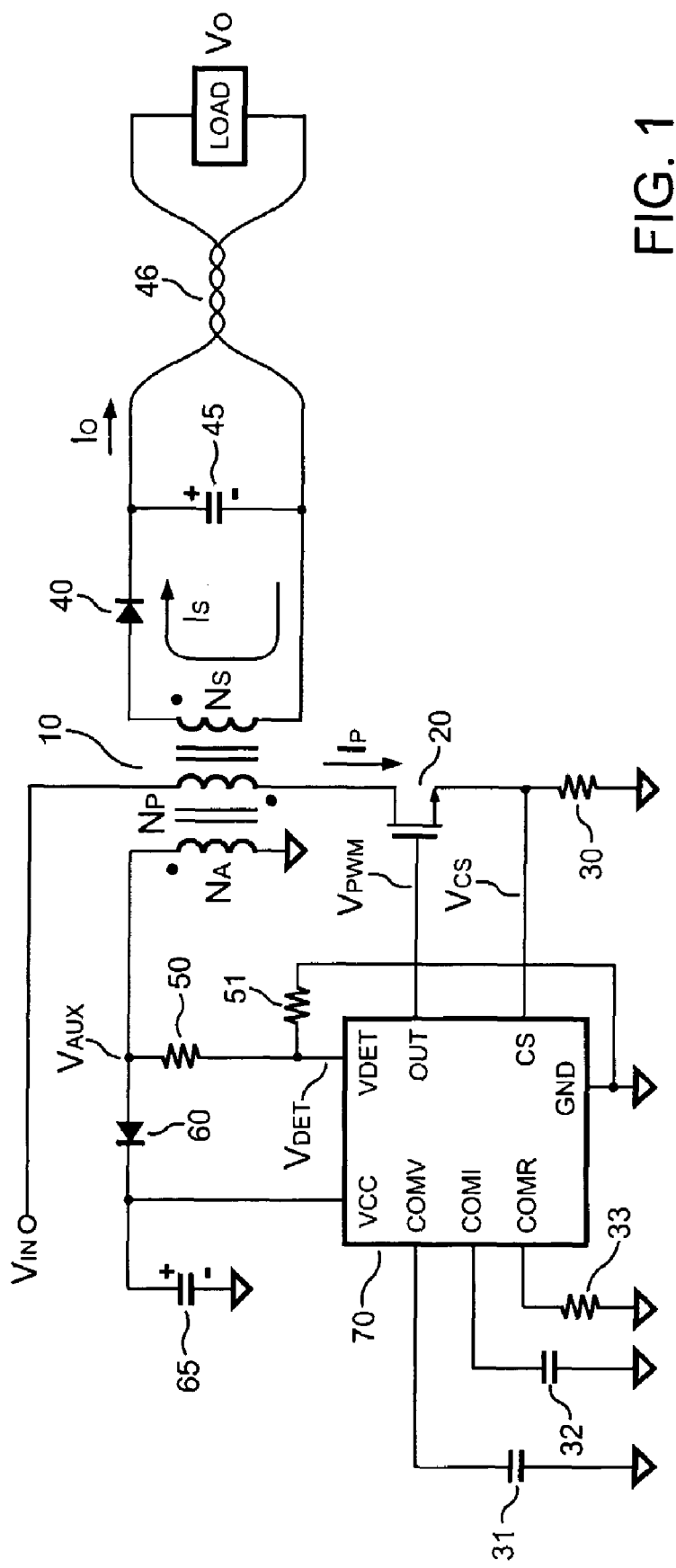
FIG. 1 illustrates a conventional circuit diagram of a primary-side controlled switching regulator.

FIG. 1 illustrates a conventional primary-side controlled switching regulator. The switching regulator includes a transformer 10 having an auxiliary winding $N_A$, a primary winding $N_P$, and a secondary winding $N_S$. To regulate an output voltage $V_O$ and an output current $I_O$ of the switching regulator, A switching signal $V_{PWM}$ is generated by a control circuit 70 to a transistor 20 for switching a transformer 10.

Figure 2:
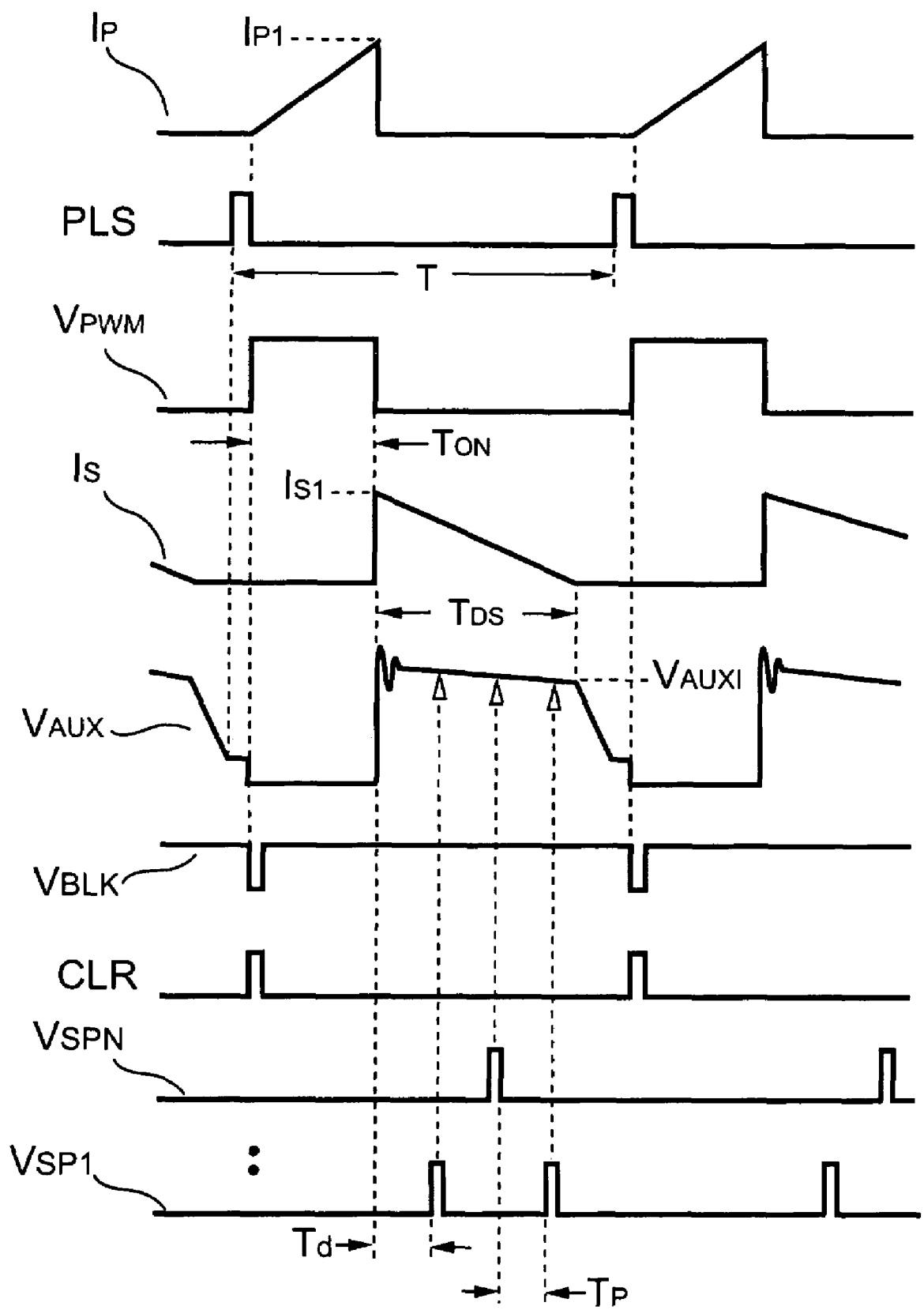
FIG. 2 illustrates a plurality of key waveforms of a conventional switching regulator.

FIG. 2 illustrates a plurality of signal waveforms of the conventional switching regulator illustrated in FIG. 1. As the switching signal $V_{PWM}$ is a logic-high, a primary-side switching current $I_P$ shall be generated accordingly. A peak value $I_{P1}$ of the primary-side switching current $I_P$ is given by:

$$I_{P1} = \frac{V_{IN}}{L_P} \times T_{ON} \qquad (1)$$

where $V_{IN}$ is an input voltage applied to the transformer 10, $L_P$ is the inductance of the primary winding $N_P$ of the transformer 10, and $T_{ON}$ is an on-time of the switching signal $V_{PWM}$.

Once the switching signal $V_{PWM}$ is dropped to a logic-low, the energy stored in the transformer 10 shall be delivered to the secondary side of the transformer 10 and to an output of the switching regulator via a rectifier 40. A secondary-side switching current $I_S$ is generated accordingly. A peak value $I_{S1}$ of the secondary-side switching current $I_S$ is expressed by the following:

$$I_{S1} = \frac{(V_O + V_F)}{L_S} \times T_{DS} \tag{2}$$

where $V_O$ is the output voltage of the switching regulator, $V_F$ is a forward voltage drop of the rectifier 40, and $L_S$ is the inductance of the secondary winding $N_S$ of the transformer 10, and $T_{DS}$ is a discharge time of the secondary-side switching current $I_S$.

Meanwhile, a reflected signal $V_{AUX}$ is generated at the auxiliary winding $N_A$ of the transformer 10. The reflected signal $V_{AUX}$ is given by:

$$V_{AUX} = \frac{T_{NA}}{T_{NS}} \times (V_O + V_F) \tag{3}$$

where $T_{NA}$ and $T_{NS}$ are a plurality of winding turns of the auxiliary winding $N_A$ and the secondary winding $N_S$ of the transformer 10, respectively.

The reflected signal $V_{AUX}$ is started to decrease as the secondary-side switching current $I_S$ is fallen to zero. This is also indicative that the energy of the transformer 10 is fully released at the moment. Therefore, as shown in FIG. 2, the discharge time $T_{DS}$ in equation (2) is measured from the falling edge of the switching signal $V_{PWM}$ to the point that the reflected signal $V_{AUX}$ is started to fall. The secondary-side switching current $I_S$ is determined by the primary-side switching current $I_P$ and the winding turns of the transformer 10. The secondary-side switching current $I_S$ is expressed by:

$$I_S = \frac{T_{NP}}{T_{NS}} \times I_P \tag{4}$$

where $T_{NP}$ is a plurality of winding turns of the primary winding $N_P$ of the transformer 10.

Referring to FIG. 1, the control circuit 70 includes a supply terminal VCC and a ground terminal GND for receiving power. A divider connected between the auxiliary winding $N_A$ of the transformer 10 and a ground reference level is formed by a resistor 50 and a resistor 51. A detection terminal DET of the control circuit 70 is connected to a joint of the resistor 50 and the resistor 51. A voltage $V_{DET}$ generated at the detection terminal DET is given by:

$$V_{DET} = \frac{R_{51}}{R_{50} + R_{51}} \times V_{AUX} \tag{5}$$

where $R_{50}$ and $R_{51}$ are the resistance of the resistors 50 and 51.

A capacitor 65 is further charged by the reflected signal $V_{AUX}$ via a rectifier 60 to power the control circuit 70. A current-sense resistor 30 is served as a current sense device. The current-sense resistor 30 is connected from a source of the transistor 20 to the ground reference level for converting the primary-side switching current $I_P$ into a current-sense signal $V_{CS}$. A sense terminal CS of the control circuit 70 is connected to the current-sense resistor 30 for detecting the current-sense signal $V_{CS}$.

The switching signal $V_{PWM}$ is generated by an output terminal OUT of the control circuit 70 to switch the transformer 10. A voltage-compensation terminal COMV is connected to a first compensation network for frequency compensation for the first error amplifier. The first compensation network can be a capacitor connected to the ground reference level, such as a capacitor 31. A current-compensation terminal COMI has a second compensation network for frequency compensation for the second error amplifier. The second compensation network can also be a capacitor connected to the ground reference level, such as a capacitor 32. A programmable terminal COMR has a resistor 33 connected to ground to adjust a reference signal $V_{REF}$ for a voltage feedback loop of the control circuit 70 in accordance with the output current $I_O$. The adjustment of the reference signal $V_{REF}$ is to compensate the voltage drop of the output cable 46 for achieving better load regulation.

Figure 3:
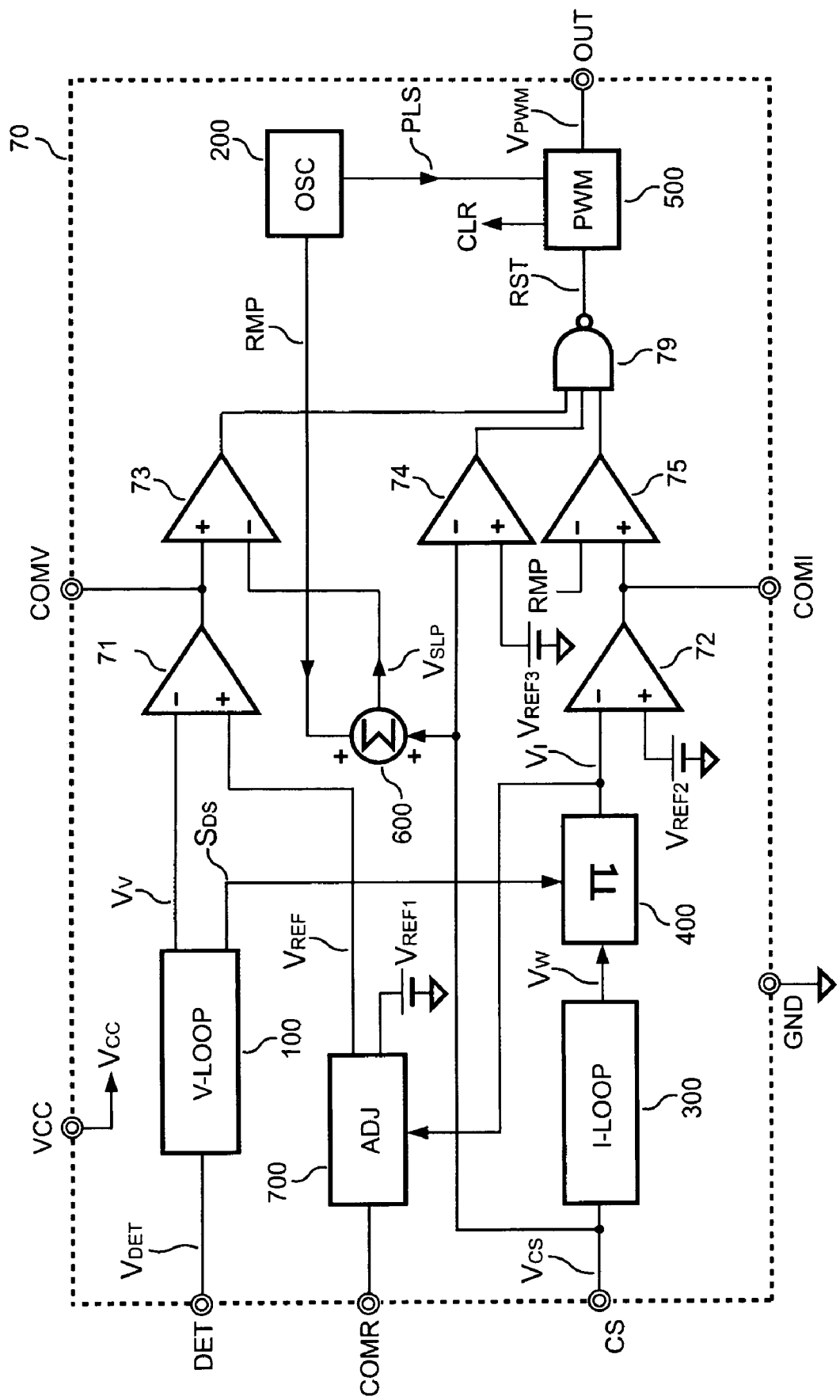
FIG. 3 illustrates a control circuit according to an embodiment of the present invention.

FIG. 3 illustrates the control circuit 70 according to an embodiment of the present invention. A first signal $V_V$ and a timing signal $S_{DS}$ is produced by a first circuit 100 by multi-sampling the voltage $V_{DET}$. The discharge time $T_{DS}$ of the secondary-side switching current $I_S$ is represented by the timing signal $S_{DS}$. A current signal $V_W$ is generated by a second circuit 300 by measuring the current-sense signal $V_{CS}$. An oscillation signal PLS is generated by an oscillator 200 for determining a switching frequency of the switching signal $V_{PWM}$. A second signal $V_I$ is produced by a third circuit 400 by integrating the current signal $V_W$ with the timing signal $S_{DS}$. A first error amplifier is developed by an operational amplifier 71 and a reference signal $V_{REF}$ for amplifying the first signal $V_V$ and providing a first feedback loop circuit for output voltage control. A second error amplifier is developed by an operational amplifier 72 and a reference signal $V_{REF2}$ for amplifying the second signal $V_I$ and providing a second feedback loop circuit for output current control. An adjust circuit 700 is coupled to the programmable terminal COMR to adjust the reference signal $V_{REF}$ in accordance with a reference signal $V_{REF1}$ and the second signal $V_I$. A PWM circuit 500 and a plurality of comparators 73 and 75 form a switching control circuit to generate the switching signal $V_{PWM}$ and to control the pulse width of the switching signal $V_{PWM}$ in response to the outputs of the first error amplifier and the second error amplifier. Both of the operational amplifiers 71 and 72 have trans-conductance output. The output of the operational amplifier 71 is connected to the voltage-compensation terminal COMV and a positive input of the comparator 73. The output of the operational amplifier 72 is connected to the current-compensation terminal COMI and a positive input of the comparator 75. A negative input of the comparator 73 is connected to an output of an adder 600. A negative input of the comparator 75 is supplied with a ramp signal RMP that is produced from the oscillator 200.

A slope signal $V_{SLP}$ is generated by the adder 600 by adding the current-sense signal $V_{CS}$ with the ramp signal RMP. A positive input of a comparator 74 is supplied with a reference signal $V_{REF3}$. A negative input of the comparator 74 is connected to the sense terminal CS for achieving a cycle-by-cycle current limit. Three inputs of a NAND gate 79 are respectively connected to the outputs of the comparators 73, 74 and 75. A reset signal RST is generated by an output of the NAND gate 79. The reset signal RST is supplied to the PWM circuit 500 for controlling the duty cycle of the switching signal $V_{PWM}$.

The current control loop is formed from the detection of the primary-side switching current $I_P$ to the pulse width modulation of the switching signal $V_{PWM}$ to control the magnitude of the primary-side switching current $I_P$ in response to the reference signal $V_{REF2}$. The secondary-side switching current $I_S$ is a ratio of the primary-side switching current $I_P$ as shown in equation (4). According to the signal waveforms in FIG. 2, the output current $I_O$ of the switching regulator is the average of the secondary-side switching current $I_S$. It is expressed by the following:

$$I_O = I_S \times \frac{T_{DS}}{2T} \quad (6)$$

Therefore, the output current ($I_O$) of the switching regulator is regulated.

The current-sense signal $V_{CS}$ is detected by the second circuit 300; and the current signal $V_W$ is generated. The second signal $V_I$ is further produced by the third circuit 400 by integrating the current signal $V_W$ with the discharge time $T_{DS}$. The second signal $V_I$ is thus designed as the following:

$$V_I = \frac{V_W}{2} \times \frac{T_{DS}}{T_I} \quad (7)$$

where the current signal $V_W$ is expressed by the following:

$$V_W = \frac{T_{NS}}{T_{NP}} \times R_S \times I_S \quad (8)$$

where $T_I$ is a time constant of the third circuit 400.

It is seen from equations (6)-(8), the second signal $V_I$ is rewritten as the following:

$$V_I = \frac{T}{T_I} \times \frac{T_{NS}}{T_{NP}} \times R_S \times I_O \quad (9)$$

It is found that the second signal $V_I$ is proportional to the output current $I_O$ of the switching regulator. The second signal $V_I$ is increased as the output current $I_O$ increases. However, the maximum value of the second signal $V_I$ is limited to the value of the reference signal $V_{REF2}$ through the regulation of the current control loop. Under the feedback control of the current control loop, a maximum output current $I_{O(max)}$ is given by the following:

$$I_{O(max)} = \frac{T_{NP}}{T_{NS}} \times \frac{G_A \times G_{SW} \times V_{REF2}}{1 + \left(G_A \times G_{SW} \times \frac{R_S}{K}\right)} \quad (10)$$

where K is a constant equal to $T_I/T$, $G_A$ is the gain of the second error amplifier, and $G_{SW}$ is the gain of the switching circuit.

As the loop gain of the current control loop is high($G_A \times G_{SW} \gg 1$), the maximum output current $I_{O(max)}$ could be briefly defined as the following:

$$I_{O(max)} = K \times \frac{T_{NP}}{T_{NS}} \times \frac{V_{REF2}}{R_S} \quad (11)$$

The maximum output current $I_{O(max)}$ of the switching regulator is thus regulated as a constant current in response to the reference signal $V_{REF2}$.

Besides, a voltage control loop is developed from the sampling of the reflected signal $V_{AUX}$ to the pulse width modulation of the switching signal $V_{PWM}$, which the magnitude of the reflected signal $V_{AUX}$ is controlled in response to the reference signal $V_{REF}$. The reflected signal $V_{AUX}$ is a ratio of the output voltage $V_O$ as shown in equation (3). The reflected signal $V_{AUX}$ is further attenuated to the voltage $V_{DET}$ as shown in equation (5). The first signal $V_V$ is generated by the first circuit 100 by multi-sampling the voltage $V_{DET}$. The value of the first signal $V_V$ is controlled in response to the value of the reference signal $V_{REF}$ through the regulation of the voltage control loop. The loop gain for the voltage control loop is provided by the first error amplifier and the switching circuit. Therefore, the output voltage $V_O$ is briefly defined as the following:

$$V_O = \left(\frac{R_{50} + R_{51}}{R_{50}} \times \frac{T_{NS}}{T_{NA}} \times V_{REF}\right) - V_F \quad (12)$$

The reflected signal $V_{AUX}$ is multi-sampled by the first circuit 100. The voltage is sampled and measured instantly before the secondary-side switching current $I_S$ is fallen to zero. Therefore, the variation of the secondary-side switching current $I_S$ does not affect the value of the forward voltage drop $V_F$ of the rectifier 40. However, the voltage drop of the output cable is varied when the output current $I_O$ is changed. The adjust circuit 700 is developed to compensate the voltage drop of the output cable. The resistor 33 is utilized to program a slope to determine the change of the reference signal $V_{REF}$ in response to the change of the second signal $V_I$. Therefore, the voltage drop is compensated in proportional to the output current $I_O$. Using different value of the resistor 33, the compensation can be programmed for a variety of the output cables 46.

Figure 4:
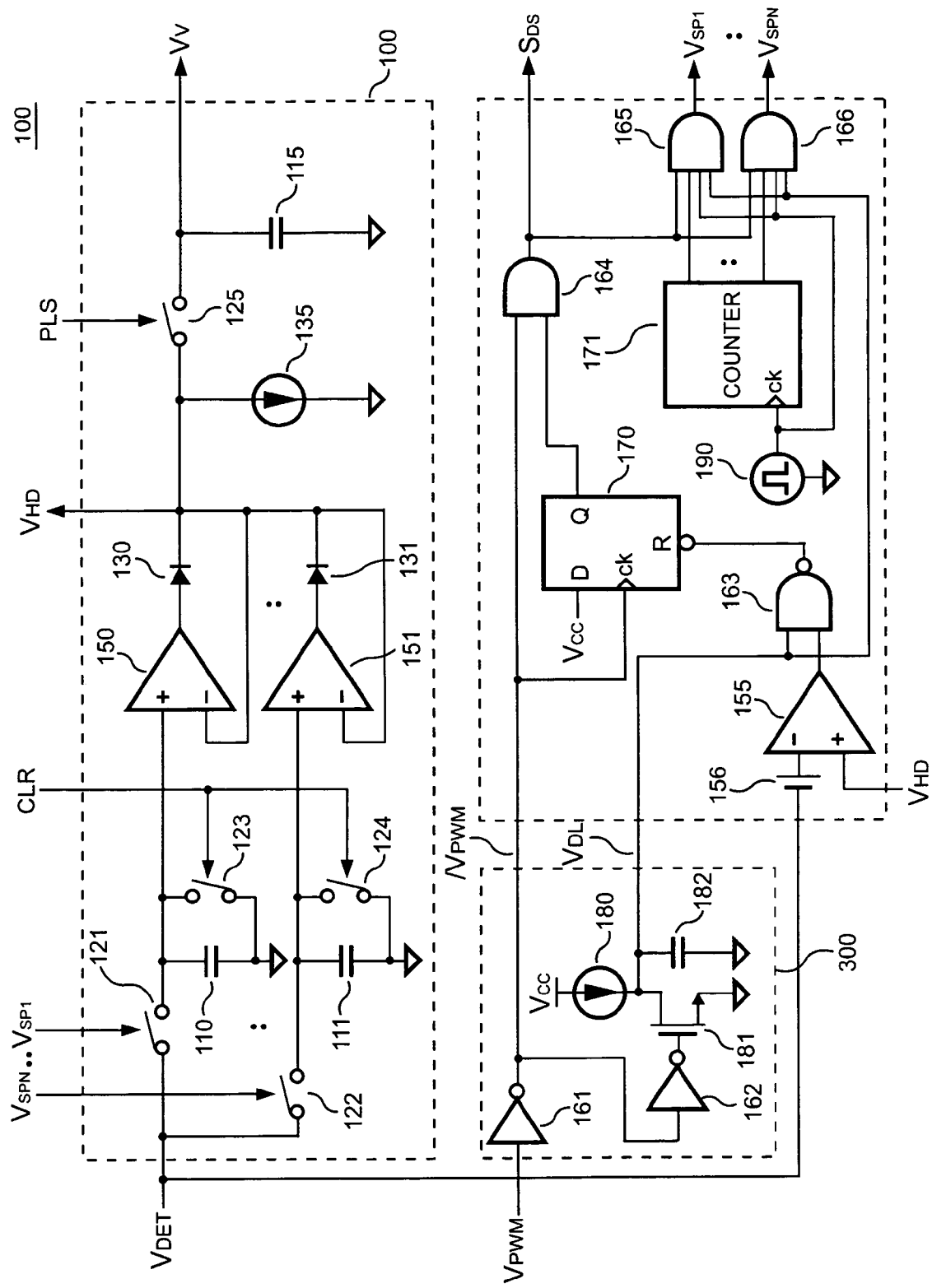
FIG. 4 illustrates a first circuit according to an embodiment of the present invention.

FIG. 4 illustrates the first circuit 100 according to an embodiment of the present invention. A sample-pulse signal is produced by a sample-pulse generator 190 for multi-sampling. A threshold voltage 156 is added up with the reflected signal $V_{AUX}$ to produce a level-shift reflected signal. A first signal generator includes a counter 171, and the AND gates 165 . . . 166 for producing the sample signals $V_{SP1}$ . . . $V_{SPN}$. A second signal generator includes a D flip-flop 170, an NAND gate 163, an AND gate 164, and a comparator 155 for producing the timing signal $S_{DS}$. A time-delay circuit includes an inverter 162, a current source 180, a transistor 181, and a capacitor 182 for generating a delay time $T_d$ as the switching signal $V_{PWM}$ is disabled. An input of an inverter 161 is supplied with the switching signal $V_{PWM}$. An output of the inverter 161 is connected to an input of the inverter 162, a first input of the AND gate 164, and a clock-input of the D flip-flop 170. The transistor 181 is turned on/off by an output of the inverter 162. The capacitor 182 is connected in parallel with the transistor 181. The current source 180 is applied to charge the capacitor 182. Therefore, the delay time $T_d$ of the time-delay circuit is determined by the current of the current source 180 and the capacitance of the capacitor 182. An output of the time-delay circuit is obtained across the capacitor 182. A D-input of the D flip-flop 170 is pulled high by a supply voltage $V_{CC}$. An output of the D flip-flop 170 is connected to a second input of the AND gate 164. The timing signal $S_{DS}$ is outputted by the AND gate 164. The timing signal $S_{DS}$ is thus enabled as the switching signal $V_{PWM}$ is disabled. The output of the NAND gate 163 is connected to a reset-input of the D flip-flop 170. Two inputs of the NAND gate 163 are respectively connected to the output of the time-delay circuit and the output of the comparator 155. A negative input of the comparator 155 is supplied with the level-shift reflected signal. A positive input of the comparator 155 is supplied with a hold voltage $V_{HD}$. Therefore, after the delay time $T_d$, the timing signal $S_{DS}$ is disabled once the level-shift reflected signal is lower than the hold voltage $V_{HD}$. Besides, the timing signal $S_{DS}$ is also disabled as long as the switching signal $V_{PWM}$ is enabled.

The sample-pulse signal is supplied to the counter 171 and the third inputs of the AND gates 165 . . . 166. The outputs of the counter 171 are respectively connected to the second inputs of the AND gates 165 . . . 166. The first inputs of the AND gates 165 . . . 166 are supplied with the timing signal $S_{DS}$. The fourth inputs of the AND gates 165 . . . 166 are connected to the output of the time-delay circuit. Therefore, the sample signals $V_{SP1}$ . . . $V_{SPN}$ are generated in response to the sample-pulse signal. Besides, the sample signals $V_{SP1}$ . . . $V_{SPN}$ are alternately produced during an enabled period of the timing signal $S_{DS}$. However, the delay time $T_d$ is inserted at the beginning of the timing signal $S_{DS}$ to inhibit the sample signals $V_{SP1}$ . . . $V_{SPN}$. The sample signals $V_{SP1}$ . . . $V_{SPN}$ are thus disabled during the period of the delay time $T_d$.

The sample signals $V_{SP1}$ . . . $V_{SPN}$ are used for sampling the reflected signal $V_{AUX}$ in sequence via the detection terminal DET and the divider. The switches 121 . . . 122 are controlled by the sample signals $V_{SP1}$ . . . $V_{SPN}$ for obtaining the hold voltages across the capacitors 110 . . . 111, respectively. The switches 123 . . . 124 are connected in parallel with the capacitors 110 . . . 111 to discharge the capacitors 110 . . . 111. A buffer circuit includes the operational amplifiers 150 . . . 151, the diodes 130 . . . 131, and a current source 135 for generating the hold voltage $V_{HD}$. The positive inputs of the operational amplifiers 150 . . . 151 are connected to the capacitors 110 . . . 111, respectively. The negative inputs of the operational amplifiers 150 . . . 151 are connected to an output of the buffer circuit. The diodes 130 . . . 131 are connected from the output of the operational amplifiers 150 . . . 151 to the output of the buffer circuit. The hold voltage $V_{HD}$ is thus obtained from the higher voltage of hold voltages. The current source 135 is used for the termination. The hold voltage $V_{HD}$ is periodically conducted by a switch 125 to a capacitor 115 for producing the first signal $V_V$. The switch 125 is turned on/off via the oscillation signal PLS. After the delay time $T_d$, the sample signals $V_{SP1}$ . . . $V_{SPN}$ are started to produce hold voltages. The spike interference of the reflected signal $V_{AUX}$ are eliminated. The spike interference of the reflected signal $V_{AUX}$ would occur when the switching signal $V_{PWM}$ is disabled and the transistor 20 is turned off.

As the secondary-side switching current $I_S$ falls to zero, the reflected signal $V_{AUX}$ is started to decrease. The aforementioned shall be detected by the comparator 155 to disable the timing signal $S_{DS}$. Therefore, the pulse width of the timing signal $S_{DS}$ is correlated to the discharge time $T_{DS}$ of the secondary-side switching current $I_S$. Meanwhile, the sample signals $V_{SP1}$ . . . $V_{SPN}$ are disabled, and the multi-sampling is stopped as the timing signal $S_{DS}$ is disabled. At the moment, the hold voltage $V_{HD}$ generated at the output of the buffer circuit is thus correlated to the reflected signal $V_{AUX}$ that is sampled once the secondary-side switching current $I_S$ is fallen to zero. The hold voltage $V_{HD}$ is obtained from the higher voltage of hold voltages, which shall ignore the voltage that is sampled when the reflected signal had started to decrease.

Figure 5:
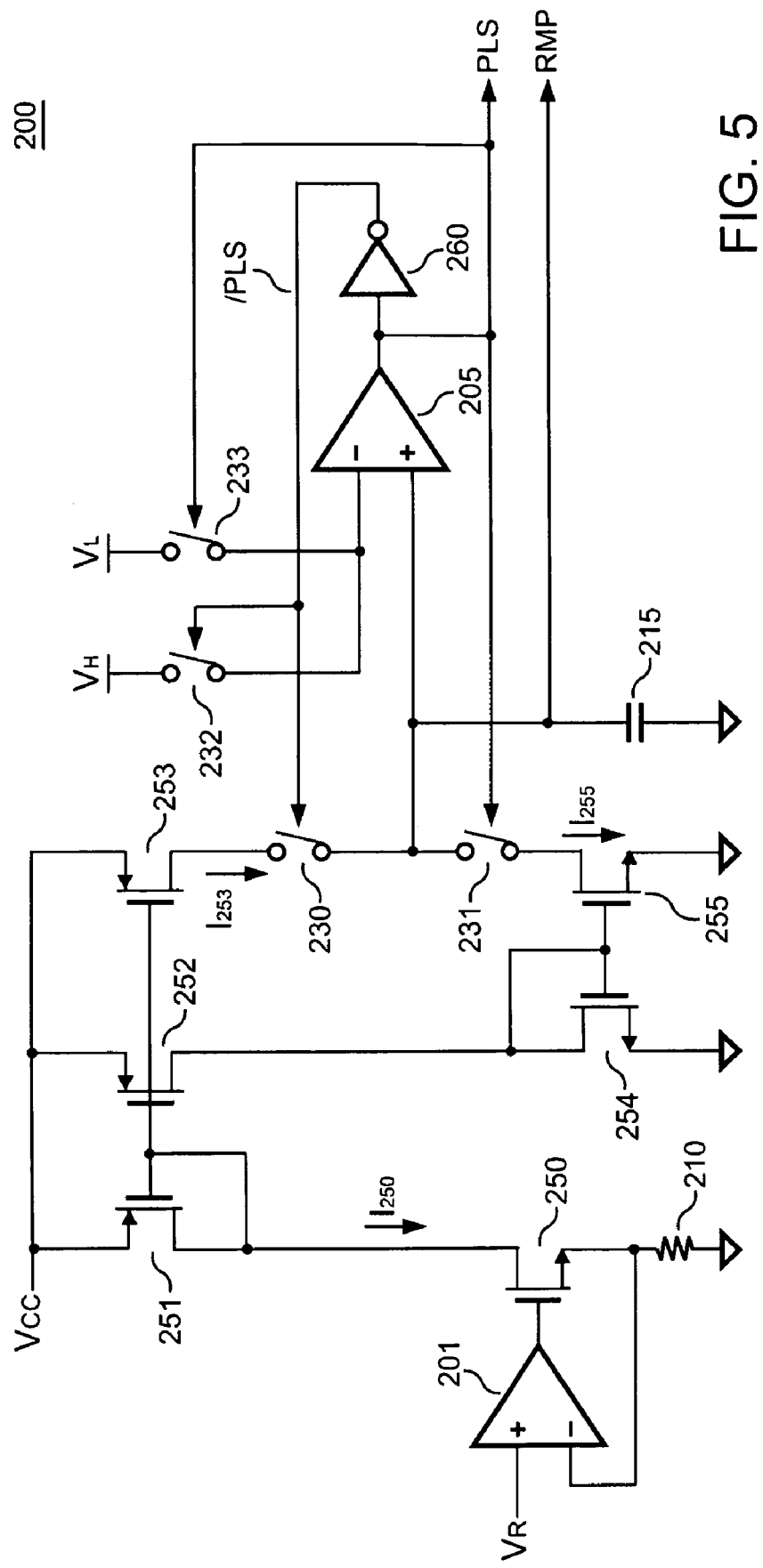
FIG. 5 illustrates an oscillator according to an embodiment of the present invention.

FIG. 5 illustrates the oscillator 200 according to an embodiment of the present invention. A first V-to-I converter is formed by an operational amplifier 201, a resistor 210, and a transistor 250. A reference current $I_{250}$ is generated by the first V-to-I converter in response to a reference signal $V_R$. Current mirrors are formed from a plurality of transistors, for example, transistors 251, 252, 253, 254 and 255 for generating an oscillator charge current $I_{253}$ and an oscillator discharge current $I_{255}$ in response to the reference current $I_{250}$. The oscillator charge current $I_{253}$ is generated by a drain of the transistor 253. The oscillator discharge current $I_{255}$ is generated by a drain of the transistor 255. A switch 230 is connected between the drain of the transistor 253 and a capacitor 215. A switch 231 is connected between the drain of the transistor 255 and the capacitor 215. The ramp signal RMP is obtained across the capacitor 215. A comparator 205 has a positive input connected to the capacitor 215. The oscillation signal PLS is outputted by the comparator 205. The switching frequency of the switching signal $V_{PWM}$ is determined by the oscillation signal PLS. A first terminal of a switch 232 is supplied with a high threshold voltage $V_H$. A first terminal of a switch 233 is supplied a low threshold voltage $V_L$. A second terminal of the switch 232 and a second terminal of the switch 233 are both connected to a negative input of the comparator 205. An input of an inverter 260 is connected to an output of the comparator 205 for producing an inverse oscillation signal /PLS. The switch 231 and the switch 233 are turned on/off by the oscillation signal PLS. The switch 230 and the switch 232 are turned on/off by the inverse oscillation signal /PLS. The resistance $R_{210}$ of the resistor 210 and the capacitance $C_{215}$ of the capacitor 215 are to determine a switching period T of the switching frequency:

$$T = \frac{C_{215} \times V_{OSC}}{V_R / R_{210}} = R_{210} \times C_{215} \times \frac{V_{OSC}}{V_R} \quad (13)$$

where $V_{OSC} = V_H - V_L$.

Figure 6:
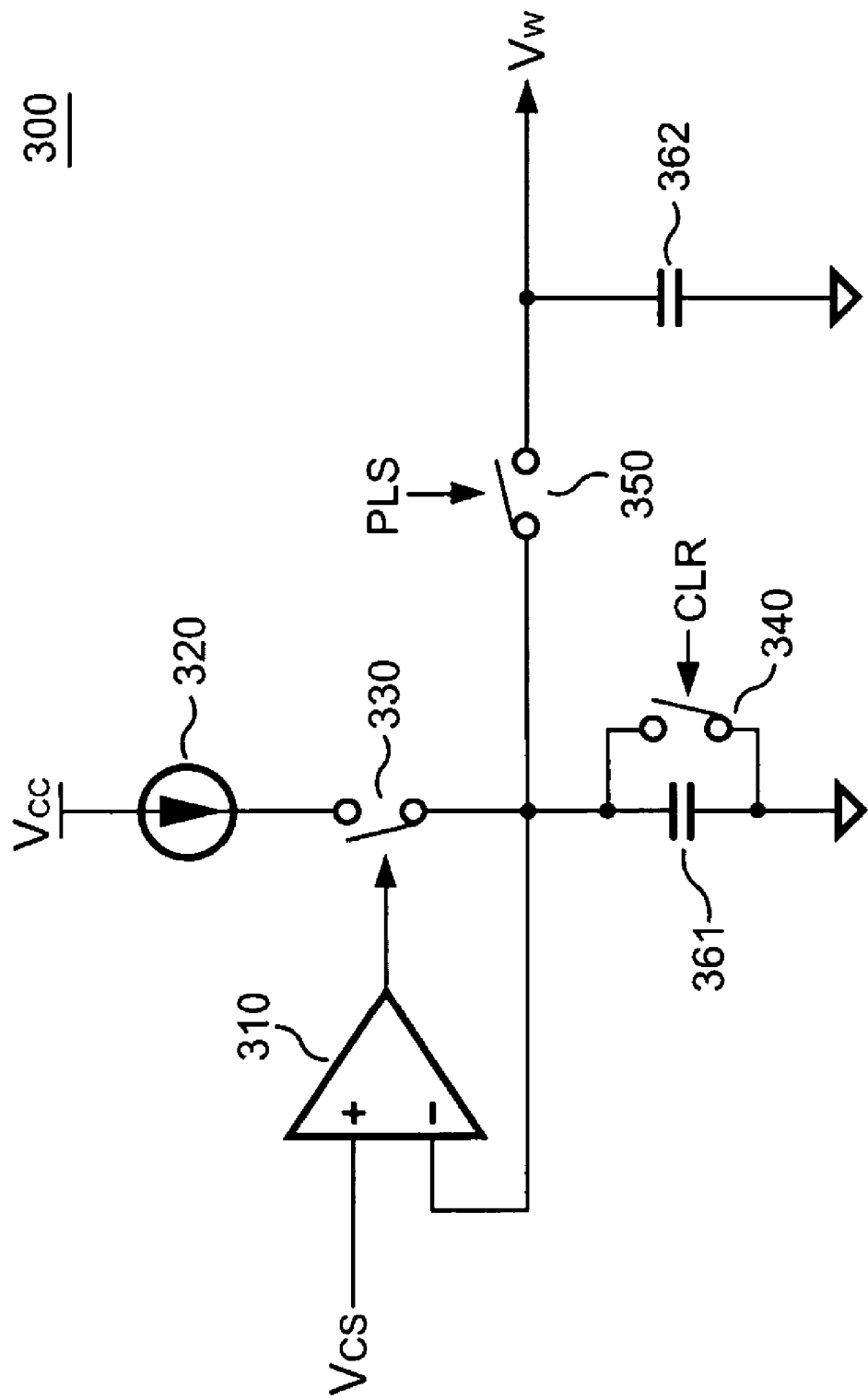
FIG. 6 illustrates a second circuit according to an embodiment of the present invention.

FIG. 6 illustrates the second circuit 300 according to an embodiment of the present invention. A fourth circuit includes a comparator 310, a current source 320, a plurality of switches 330, 340, and a capacitor 361. The peak value of the current-sense signal $V_{CS}$ is sampled for generating a fourth signal. A positive input of the comparator 310 is supplied with the current-sense signal $V_{CS}$. A negative input of the comparator 310 is connected to the capacitor 361. The switch 330 is connected between the current source 320 and the capacitor 361. The switch 330 is turned on/off by an output of the comparator 310. The switch 340 is connected in parallel with the capacitor 361 for discharging the capacitor 361. The fourth signal is periodically conducted by a switch 350 to a capacitor 362 for producing the current signal $V_W$. The switch 350 is turned on/off by the oscillation signal PLS.

Figure 7:
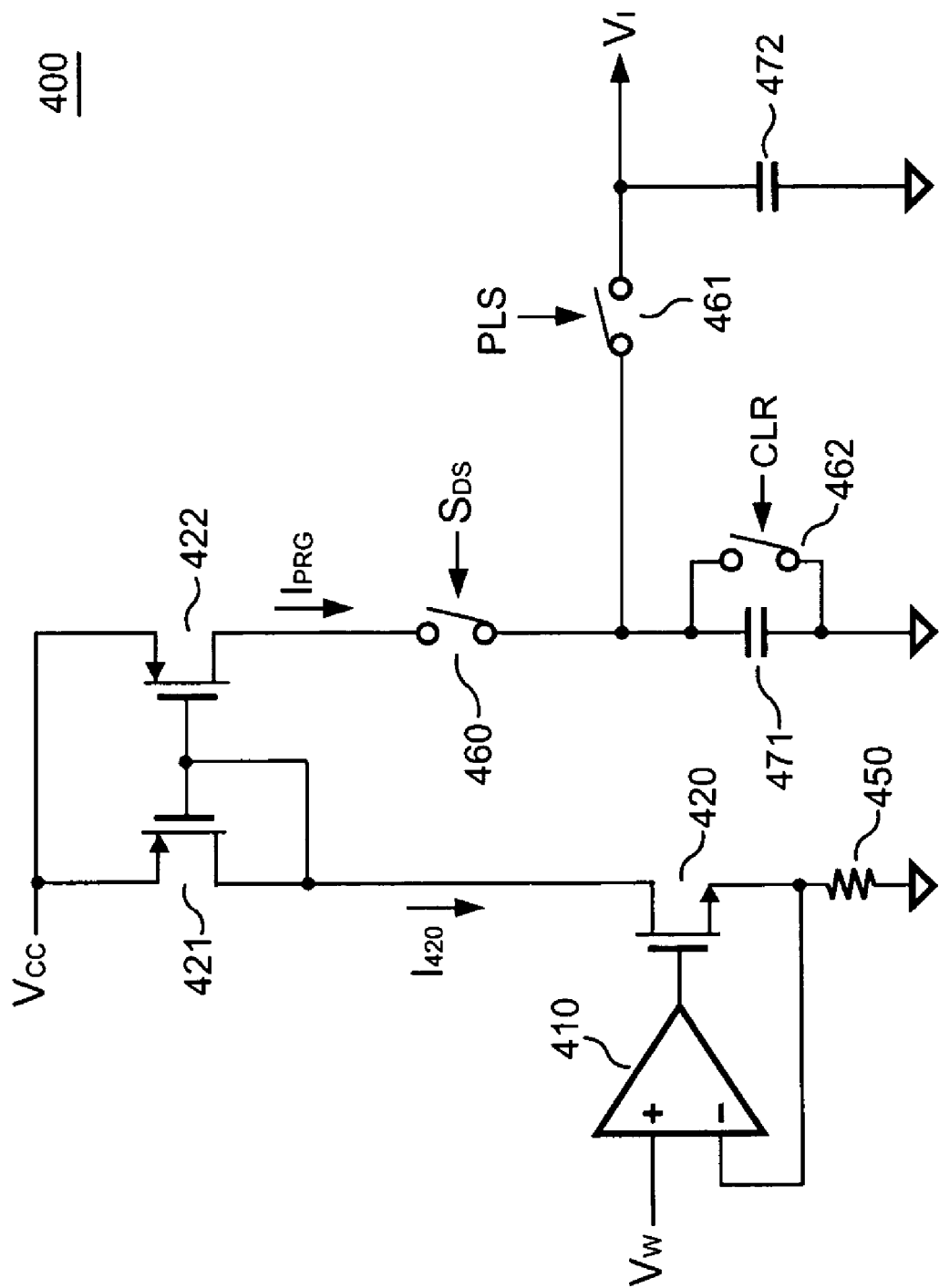
FIG. 7 illustrates a third circuit according to an embodiment of the present invention.

FIG. 7 illustrates the third circuit 400 according to an embodiment of the present invention. A second V-to-I converter includes an operational amplifier 410, a resistor 450, and the transistors 420, 421, 422. A positive input of the operational amplifier 410 is supplied with the current signal $V_W$. A negative input of the operational amplifier 410 is connected to the resistor 450. A gate of the transistor 420 is driven by an output of the operational amplifier 410. A source of the transistor 420 is coupled to the resistor 450. A current $I_{420}$ is generated by the second V-to-I converter via a drain of the transistor 420 in response to the current signal $V_W$. A current mirror having a 2:1 ratio is formed by the transistors 421 and 422. The current mirror is driven by the current $I_{420}$ to produce a programmable charge current $I_{PRG}$ via a drain of the transistor 422. The programmable charge current $I_{PRG}$ is expressed by the following:

$$I_{PRG} = \frac{1}{R_{450}} \times \frac{V_W}{2} \qquad (14)$$

where $R_{450}$ is the resistance of the resistor 450.

A capacitor 471 is used to produce an integrated signal. A switch 460 is connected between the drain of the transistor 422 and the capacitor 471. The switch 460 is turned on/off by the timing signal $S_{DS}$. A switch 462 is connected in parallel with the capacitor 471 for discharging the capacitor 471. The integrated signal is periodically conducted by a switch 461 to a capacitor 472 for producing the second signal $V_I$. The switch 461 is turned on/off by the oscillation signal PLS. The second signal $V_I$ is therefore obtained across the capacitor 472 as shown:

$$V_I = \frac{1}{R_{450} \times C_{471}} \times \frac{V_W}{2} \times T_{DS} \qquad (15)$$

According to an embodiment of the present invention illustrated in FIG. 4~7, the second signal $V_I$ is correlated to the secondary-side switching current $I_S$ and the output current $I_O$ of the switching regulator. Thus, the equation (9) is rewritten as the following:

$$V_I = m \times \frac{T_{NS}}{T_{NP}} \times R_S \times I_O \qquad (16)$$

where m is a constant, which is determined by the following:

$$m = \frac{R_{210} \times C_{215}}{R_{450} \times C_{471}} \times \frac{V_{OSC}}{V_R} \qquad (17)$$

The resistance $R_{450}$ of the resistor 450 is correlated to the resistance $R_{210}$ of the resistor 210. The capacitance $C_{471}$ of the capacitor 471 is correlated to the capacitance $C_{215}$ of the capacitor 215. Therefore, the second signal $V_I$ is proportional to the output current $I_O$ of the switching regulator.

Figure 8:
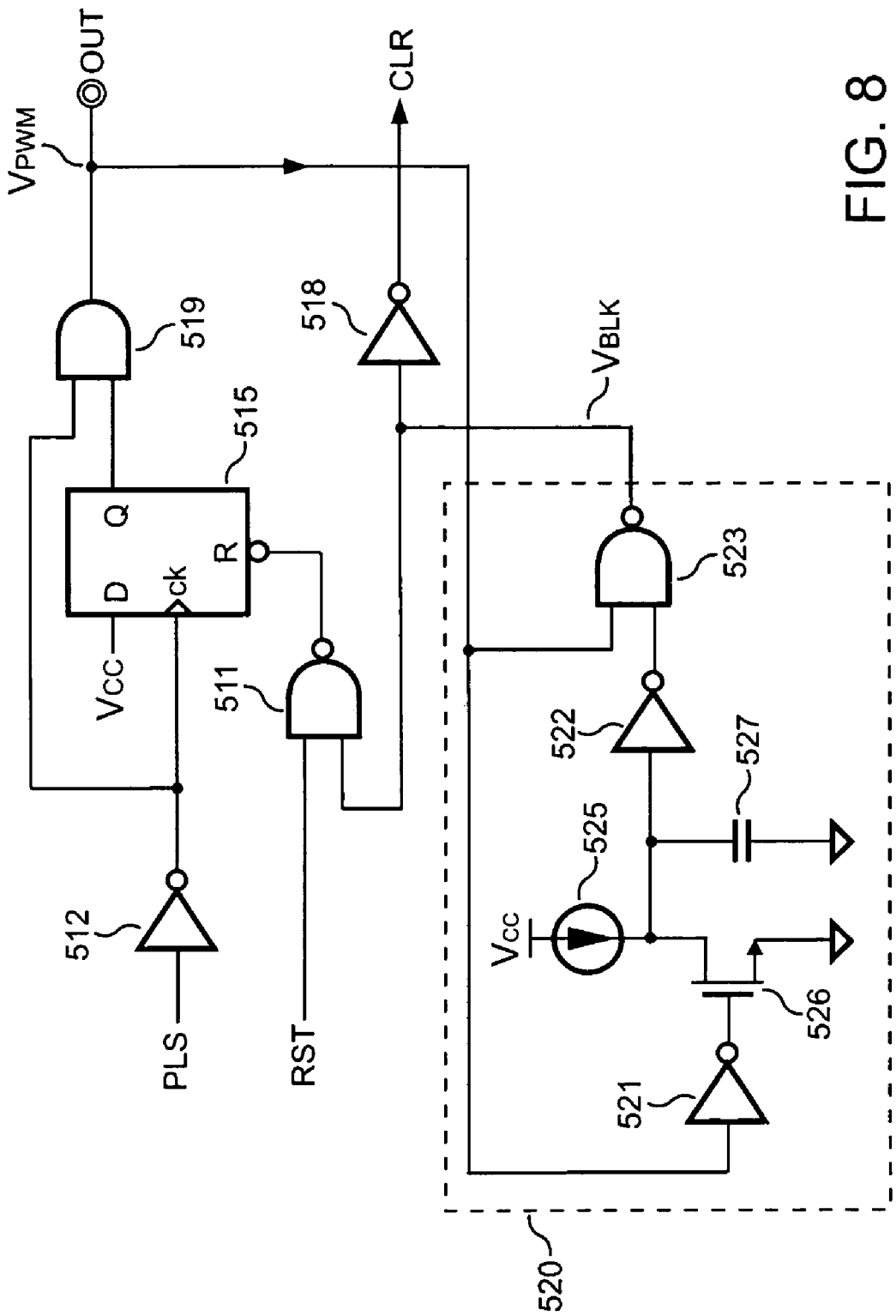
FIG. 8 illustrates a PWM circuit according to an embodiment of the present invention.

FIG. 8 illustrates a circuit schematic of the PWM circuit 500 according to an embodiment of the present invention. The PWM circuit 500 includes a NAND gate 511, a D flip-flop 515, an AND gate 519, a blanking circuit 520, and the inverters 512, 518. A D-input of the D flip-flop 515 is pulled high by the supply voltage $V_{CC}$. An input of the inverter 512 is driven by the oscillation signal PLS. An output of the inverter 512 is connected to a clock-input of the D flip-flop 515 for enabling the switching signal $V_{PWM}$. An output of the D flip-flop 515 is connected to a first input of the AND gate 519. A second input of the AND gate 519 is coupled to the output of the inverter 512. The switching signal $V_{PWM}$ is outputted by the AND gate 519 to switch the transformer 10. A reset-input of the D flip-flop 515 is connected to an output of the NAND gate 511. A first input of the NAND gate 511 is supplied with the reset signal RST for the cycle-by-cycle disabling of the switching signal $V_{PWM}$. The second input of the NAND gate 511 is connected to an output of the blanking circuit 520 for ensuring a minimum on-time of the switching signal $V_{PWM}$ when the switching signal $V_{PWM}$ is enabled. A minimum value of the discharge time $T_{DS}$ is ensured by the minimum on-time of the switching signal $V_{PWM}$, which a proper multi-sampling of the reflected signal $V_{AUX}$ in the first circuit 100 is ensured. The discharge time $T_{DS}$ is correlated to the on-time of the switching signal $V_{PWM}$. Referring to equations (1), (2), and (4), and the secondary inductance $L_S$, which is shown in equation (18), the discharge time $T_{DS}$ is expressed as equation (19) as shown in the following:

$$L_S = (T_{NS}/T_{NP})^2 \times L_P \qquad (18)$$

$$T_{DS} = \left(\frac{V_{IN}}{V_O + V_F}\right) \times \frac{T_{NS}}{T_{NP}} \times T_{ON} \qquad (19)$$

where $T_{ON}$ is the on-time of the switching signal $V_{PWM}$.

An input of the blanking circuit 520 is supplied with the switching signal $V_{PWM}$. When the switching signal $V_{PWM}$ is enabled, the blanking circuit 520 shall generate a blanking signal $V_{BLK}$ to inhibit the reset of the D flip-flop 515. The blanking circuit 520 further includes an NAND gate 523, a current source 525, a capacitor 527, a transistor 526, and a plurality of inverters 521, 522. The switching signal $V_{PWM}$ is supplied to an input of the inverter 521 and the first input of the NAND gate 523. The current source 525 is applied to charge the capacitor 527. The capacitor 527 is connected in parallel with the transistor 526. The transistor 526 is turned on/off by an output of the inverter 521. An input of the inverter 522 is coupled to the capacitor 527. An output of the inverter 522 is connected to a second input of the NAND gate 523. The blanking signal $V_{BLK}$ is outputted by an output of the NAND gate 523. The pulse width of the blanking signal $V_{BLK}$ is determined by the current of the current source 525 and the capacitance of the capacitor 527. An input of an inverter 518 is connected to the output of the NAND gate 523. A clear signal (CLR) is generated by an output of the inverter 518 to turn on/off the switches 123, 124, 340 and 462.

Figure 9:
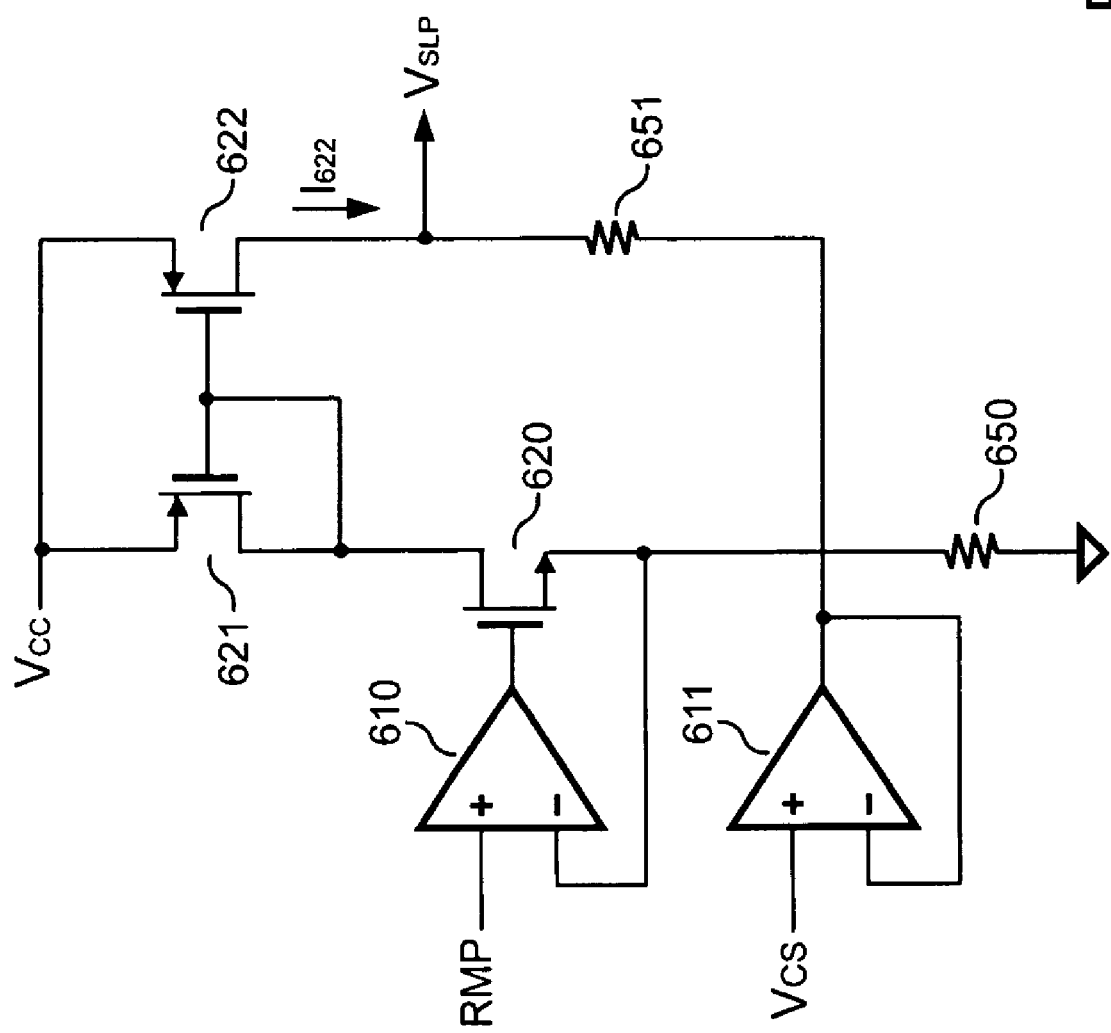
FIG. 9 illustrates a circuit schematic of an adder according to an embodiment of the present invention.

FIG. 9 illustrates a circuit schematic of the adder 600 according to an embodiment of the present invention. A third V-to-I converter is formed by an operational amplifier 610, a plurality of transistors 620, 621, 622, and a resistor 650 for generating a current $I_{622}$ in response to the ramp signal RMP. A positive input of an operational amplifier 611 is supplied with the current-sense signal $V_{CS}$. A negative input and an output of the operational amplifier 611 are connected together to build the operational amplifier 611 as a buffer. A drain of the transistor 622 is connected to the output of the operational amplifier 611 via a resistor 651. The slope signal $V_{SLP}$ is generated at the drain of the transistor 622. The slope signal $V_{SLP}$ is therefore correlated to the ramp signal RMP and the current-sense signal $V_{CS}$.

Figure 10:
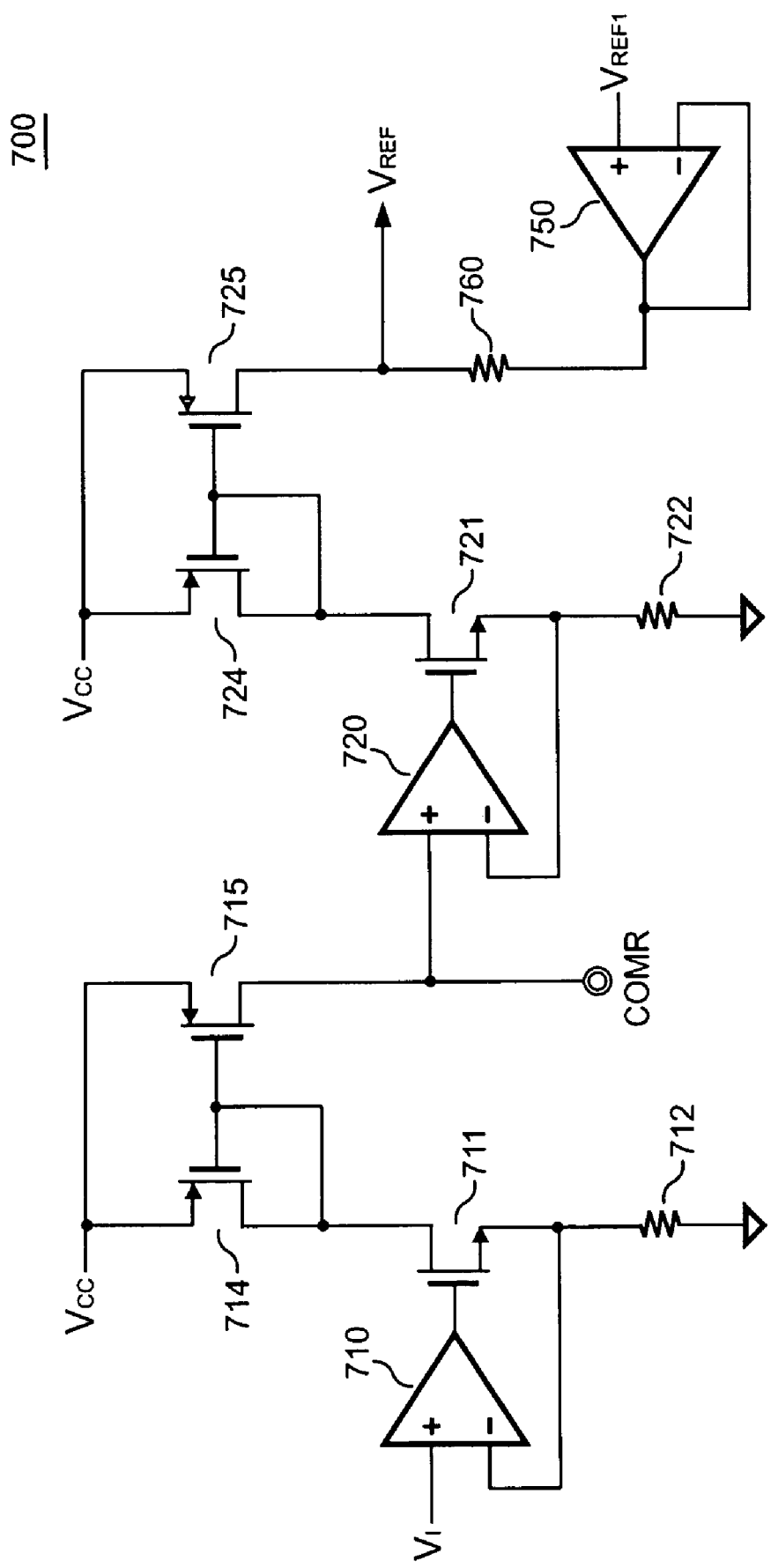
FIG. 10 illustrates an adjust circuit for programming a reference signal according to an embodiment of the present invention.

FIG. 10 illustrates a circuit schematic of the adjust circuit 700 according to an embodiment of the present invention. A V-to-I converter is formed by an operational amplifier 710, a plurality of transistors 711, 714, 715, and a resistor 712 for generating a current $I_{715}$ in response to the second signal $V_I$. A positive input of an operational amplifier 710 is supplied with the second signal $V_I$. The current $I_{715}$ is outputted to the programmable terminal COMR. The current $I_{715}$ is associated with the resistor 33 which generates a voltage $V_{COMR}$ connected to an operational amplifier 720. Another V-to-I converter is formed by the operational amplifier 720, a plurality of transistors 721, 724, 725, and a resistor 722 for generating a current $I_{725}$ at the drain of the transistor 725 in response to the voltage $V_{COMR}$. A negative input and an output of the operational amplifier 750 are connected together to build the operational amplifier 750 as a buffer. The positive input of the operational amplifier 750 is connected to the reference signal $V_{REF1}$. A drain of the transistor 725 is connected to the output of the operational amplifier 750 via a resistor 760. The reference signal $V_{REF}$ is generated at the drain of the transistor 725. Based on the reference signal $V_{REF1}$, the reference signal $V_{REF}$ is adjusted by the second signal $V_I$ and is programmed by the resistor 33.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A primary-side controlled switching regulator, comprising:
    a transformer, for transferring the energy from a primary-side to a secondary side of the transformer;
    a switching device, for switching the transformer;
    a control circuit, coupled to the transformer for generating a switching signal to switch the switching device and to regulate the output of the switching regulator;
    wherein the control circuit including:
    a first circuit, coupled to the transformer for generating a first signal and a timing signal by measuring a reflected signal of the transformer, and wherein the timing signal represents a discharge time of the transformer;
    a second circuit and a third circuit producing a second signal by integrating a current signal with the timing signal, and wherein the current signal represents a primary-side switching current of the transformer;
    a first error amplifier, having a first reference signal for generating a first feedback signal in response to the first signal; and wherein the first reference signal is increased in response to the increase of the second signal;
    a second error amplifier, having a second reference signal for generating a second feedback signal in response to the second signal; and
    a switching control circuit, generating the switching signal in response to the first feedback signal and the second feedback signal.

2. The primary-side controlled switching regulator as claimed in claim 1, wherein the control circuit further comprising:
    a supply terminal and a ground terminal, for receiving power;
    a detection terminal, for connecting the first circuit to the transformer through a resistor of a divider;
    a sense terminal, for connecting the second circuit to a current-sense device for receiving the current signal, and the current-sense device is used for converting the primary-side switching current to the current signal;
    an output terminal, for generating the switching signal to switch the transformer via the switching device;
    a voltage-compensation terminal, connected to a first-compensation network for the frequency compensation for the first error amplifier;
    a current-compensation terminal, connected to a second-compensation network for the frequency compensation for the second error amplifier; and
    a programmable terminal, connected a resistor to ground to determine a slope, wherein the slope represents the change of the first reference signal versus the change of the second signal.

3. The primary-side controlled switching regulator as claimed in claim 1, wherein a time constant of the third circuit is correlated with a switching period of the switching signal.

4. The primary-side controlled switching regulator as claimed in claim 1, wherein the first circuit comprising:
    a threshold voltage, wherein the threshold voltage adds to the reflected signal to produce a level-shift signal;
    a plurality of capacitors;
    a signal generator, producing sample signals, wherein the sample signals are used for sampling the reflected signal, and hold voltages are respectively generated across the capacitors, and the sample signals are generated in sequence during an enabled period of the timing signal;
    a buffer circuit, generating a hold signal from the higher voltage of hold voltages;
    a first output capacitor, for generating the first signal in response to the hold signal;
    a second signal generator, producing the timing signal, wherein the timing signal is enabled as the switching signal is disabled, and the timing signal is disabled when the level-shift signal is lower than the hold signal.

5. The primary-side controlled switching regulator as claimed in claim 1, wherein the first circuit multi-sampling the reflected signal to generate the first signal, and the first signal is obtained instantly once the discharge current of the transformer is fallen to zero.

6. The primary-side controlled switching regulator as claimed in claim 1, wherein the second circuit comprising:
    a fourth circuit, generating a fourth signal by sampling the current signal;
    a third capacitor, holding the fourth signal;
    a second output capacitor, producing a current waveform signal; and
    a switch, conducting the fourth signal to the second output capacitor.

7. The primary-side controlled switching regulator as claimed in claim 1, wherein the third circuit comprising:
    a V-to-I converter, generating a charge current in response to the current waveform signal;
    a timing capacitor, coupled to the charge current via a first switch to produce an integrated signal in response to the timing signal;
    a second switch, connected in parallel with the timing capacitor for discharging the timing capacitor;
    a third output capacitor, producing the second signal; and
    a third switch, conducting the integrated signal to the third output capacitor.

8. The primary-side controlled switching regulator as claimed in claim 1, wherein the switching signal has a minimum on-time when the switching signal is enabled, which further ensuring a minimum value of the discharge time for multi-sampling the reflected signal.

9. A switching regulator, comprising:
a transformer, for transferring the energy from a primary-side to a secondary side of the transformer;
a switching device, for switching the transformer;
a control circuit, coupled to the transformer for generating a switching signal to switch the switching device and regulate the output of the switching regulator;
wherein the control circuit including:
a first circuit, coupled to the transformer to generate a first signal and a timing signal by measuring a reflected signal of the transformer, and the timing signal represents a discharge time of the transformer;
a second circuit, producing a second signal by integrating a current signal with the timing signal, and the current signal represents a primary-side switching current of the transformer;
a first feedback circuit, for generating a first feedback signal in response to the first signal;
a second feedback circuit, for generating a second feedback signal in response to the second signal; and
a switching control circuit, generating the switching signal in response to the first feedback signal and the second feedback signal.

10. The switching regulator as claimed in claim 9, wherein the first feedback circuit further comprising a first reference signal for generating the first feedback signal in response to the first signal and the first reference signal, and the first reference signal is varied in response to the change of the second signal.

11. The switching regulator as claimed in claim 9, wherein the control circuit further comprising:
a supply terminal and a ground terminal, for receiving power;
a detection terminal, for coupling the first circuit to the transformer;
a sense terminal, for coupling the second circuit to a current-sense device for receiving the current signal, wherein the current-sense device is used for converting the primary-side switching current to the current signal;
an output terminal, for generating the switching signal for switching the transformer via the switching device;
a voltage-compensation terminal, for the frequency compensation of the first feedback circuit; and
a current-compensation terminal, for the frequency compensation of the second feedback circuit.

12. The switching regulator as claimed in claim 9, wherein the first circuit comprising:
a threshold voltage, wherein the threshold voltage adding the reflected signal for producing a level-shift signal;
a plurality of capacitors;
a signal generator, producing sample signals to sample and to hold the reflected signal to the capacitors, wherein hold voltages are respectively generated across the capacitors, and sample signals are generated in response to the enabling of the timing signal;
a buffer circuit, generating the first signal in accordance with the hold voltages;
a second signal generator, producing the timing signal in response to hold voltages and the level-shift signal, wherein the timing signal is enabled as the switching signal is disabled, and the timing signal is disabled when the level-shift signal is lower than the hold voltages.

13. The switching regulator as claimed in claim 9, wherein the first circuit multi-sampling the reflected signal to generate the first signal, and the first signal is acquired after the discharge current of the transformer is fallen to zero.

14. The primary-side controlled switching regulator as claimed in claim 9, wherein the second circuit comprising:
a current generator, generating a charge current by sampling the current signal; and
a capacitor, coupled to the charge current for producing the second signal in response to the timing signal.

15. The switching regulator as claimed in claim 9, wherein the switching signal has a minimum on-time when the switching signal is enabled, which further ensuring a minimum value of the discharge time for multi-sampling the reflected signal.

16. A switching power converter, comprising:
a transformer, for transferring the energy from a primary-side to a secondary side of the transformer;
a switching device, for switching the transformer;
a control circuit, coupled to the transformer for generating a switching signal to switch the switching device and to regulate the output of the switching regulator;
wherein the control circuit including:
a first circuit, coupled to the transformer for generating a first signal by measuring a reflected signal of the transformer;
a second circuit, producing a second signal in response to a current signal, wherein the current signal represents a primary-side switching current of the transformer;
a first feedback circuit, generating a first feedback signal in response to the first signal;
a second feedback circuit, generating a second feedback signal in response to the second signal; and
a switching control circuit, generating the switching signal in response to the first feedback signal and the second feedback signal.

17. The switching power converter as claimed in claim 16, wherein the first feedback circuit further including a first reference signal for generating the first feedback signal in response to the first signal, and the first reference signal is varied in response to the change of the second signal.

18. The switching power converter as claimed in claim 16, wherein the control circuit further comprising:
a supply terminal and a ground terminal, for receiving power;
a detection terminal, for connecting the first circuit to the transformer through a resistor of a divider;
a sense terminal, for connecting the second circuit to a current-sense device for receiving the current signal, wherein the current-sense device is used for converting the primary-side switching current to the current signal;
an output terminal, for generating the switching signal to switch the transformer via the switching device;
a first-compensation terminal, for the frequency compensation of the first feedback circuit; and
a second-compensation terminal, for the frequency compensation of the second feedback circuit.

19. The switching power converter as claimed in claim 16, wherein the first circuit comprising:
a plurality of capacitors;
a signal generator, producing sample signals to sample and to hold the reflected signal to the capacitors, wherein hold voltages are respectively generated across the capacitors; and sample signals are generated in response to the enabling of a timing signal;
a buffer circuit, generating the first signal in accordance with the hold voltages;

a second signal generator, producing the timing signal in response to hold voltage, wherein the timing signal is enabled as the switching signal is disabled, and the timing signal is disabled when the reflected signal is significantly lower than the hold signal.

20. The switching power converter as claimed in claim 16, wherein the first circuit multi-sampling the reflected signal for generating the first signal, and the first signal is acquired once the discharge current of the transformer is fallen to zero.

21. The switching power converter as claimed in claim 16, wherein the switching signal has a minimum on-time when the switching signal is enabled, which further ensuring a minimum value of the discharge time for multi-sampling the reflected signal.

22. A switching regulator, comprising:
   a transformer, for transferring the energy from a primary-side to a secondary side of the transformer;
   a switching device, for switching the transformer;
   a control circuit, coupled to the transformer for generating a switching signal for switching the switching device and regulating the output of the switching regulator;
   wherein the control circuit including:
   a first circuit, coupled to the transformer to generate a first signal by measuring a reflected signal of the transformer;
   a second circuit, producing a second signal by measuring a current signal, wherein the current signal is correlated to the output current of the switching regulator;
   a feedback circuit, including a reference signal for generating a feedback signal in response to the first signal and the reference signal, and the reference signal is varied in response to the second signal; and
   a switching control circuit, generating the switching signal in response to the feedback signal.

23. The switching regulator as claimed in claim 22, wherein the first circuit comprises:
   a plurality of capacitors;
   a signal generator producing sample signals to sample and to hold the reflected signal to the capacitors, wherein hold voltages are respectively generated across the capacitors, and samples signals are generated in response to the enable of a timing signal;
   a buffer circuit, generating the first signal in accordance with the hold voltages;
   a second signal generator, producing the timing signal in response to hold voltage, wherein the timing signal is enabled as the switching signal is disabled; the timing signal is disabled when the reflected signal is significant lower than the hold signal.

24. The switching regulator as claimed in claim 22, wherein the first circuit multi-sampling the reflected signal for generating the first signal, and the first signal is acquired once the discharge current of the transformer is fallen to zero.

25. The switching regulator as claimed in claim 22, wherein the second circuit comprising:
   a current generator, generating a charge current in response to the current signal; and
   a capacitor, coupled to the charge current for producing the second signal in response to the timing signal.

26. The switching regulator as claimed in claim 22, wherein the switching signal has a minimum on-time when the switching signal is enabled, which further ensuring a minimum value of the discharge time for multi-sampling the reflected signal.

27. A switching regulator, comprising:
   a transformer, for transferring the energy from a primary-side to a secondary side of the transformer;
   a switching device, for switching the transformer;
   a control circuit, coupled to the transformer for generating a switching signal to switch the switching device and to regulate the output of the switching regulator;
   wherein the control circuit including:
   a first circuit, coupled to the transformer for generating a first signal by measuring a reflected signal of the transformer;
   a second circuit, producing a second signal by measuring a current signal, wherein the current signal is correlated to the output current of the switching regulator;
   a feedback circuit, generating a feedback signal in response to the first signal, and the first signal is varied in response to the second signal; and
   a switching control circuit, generating the switching signal in response to the feedback signal.

* * * * *